(12) United States Patent
Jones

(10) Patent No.: US 12,529,543 B2
(45) Date of Patent: Jan. 20, 2026

(54) GENERATION AND APPLICATION OF AUTONOMOUSLY-CREATED THREE-DIMENSIONAL SAFETY OFFSET BOUNDING SURFACES FROM THREE-DIMENSIONAL VIRTUAL MAPS AROUND POINTS OF INTEREST

(71) Applicant: Raytheon Company, Waltham, MA (US)

(72) Inventor: Nathan A. Jones, Vail, AZ (US)

(73) Assignee: Raytheon Company, Arlington, VA (US)

( * ) Notice: Subject to any disclaimer, the term of this patent is extended or adjusted under 35 U.S.C. 154(b) by 493 days.

(21) Appl. No.: 17/561,484

(22) Filed: Dec. 23, 2021

(65) Prior Publication Data

US 2023/0204326 A1   Jun. 29, 2023

(51) Int. Cl.
| | | |
|---|---|---|
| *F41G 7/22* | (2006.01) | |
| *F42B 15/01* | (2006.01) | |
| *F42B 15/08* | (2006.01) | |
| *F42B 30/00* | (2006.01) | |
| *G01S 17/89* | (2020.01) | |

(52) U.S. Cl.
CPC ......... *F41G 7/2226* (2013.01); *F41G 7/2206* (2013.01); *F42B 15/01* (2013.01); *F42B 15/08* (2013.01); *F42B 30/006* (2013.01); *G01S 17/89* (2013.01)

(58) Field of Classification Search
None
See application file for complete search history.

(56) References Cited

U.S. PATENT DOCUMENTS

| | | |
|---|---|---|
| 8,126,642 B2 | 2/2012 | Trepagnier et al. |
| 8,600,589 B2 | 12/2013 | Mendez-Rodriguez et al. |
| 9,965,964 B2 | 5/2018 | Bernhardt et al. |
| 10,145,951 B2 | 12/2018 | Izzat et al. |
| 10,181,080 B2 | 1/2019 | Schultz et al. |
| 10,416,837 B2 * | 9/2019 | Reif ................ G02B 27/017 |
| 10,438,371 B2 | 10/2019 | Xu et al. |
| 10,467,914 B2 | 11/2019 | Valls Hernandez et al. |
| 10,663,300 B2 | 5/2020 | Huang et al. |
| 11,106,203 B2 | 8/2021 | Huang et al. |
| 2006/0209018 A1 * | 9/2006 | Watanabe ............. G06F 3/037 |
| | | 345/156 |
| 2019/0272671 A1 * | 9/2019 | Zhang ................... G06T 17/20 |
| 2022/0147049 A1 * | 5/2022 | Meng ................... G01S 13/867 |
| 2023/0392899 A1 * | 12/2023 | Scheibel ................ F41G 3/22 |

OTHER PUBLICATIONS

Author: Equator Studios.Title: 3D Mapping—How to Make a 3D Map—Step by Step Tutorial. Publication Date: Apr. 5, 2022. Publisher: Youtube. URL: https://www.youtube.com/watch?v=nchvDrn8ND8.*

* cited by examiner

*Primary Examiner* — Matthew Ell
*Assistant Examiner* — David V Luu

(57) ABSTRACT

An apparatus includes at least one memory configured to store map data. The apparatus also includes at least one processor configured to segment one or more objects from one or more environment surfaces in the map data. The at least one processor is also configured to determine an offset based on a projectile drift. The at least one processor is further configured to generate a safety bounding box around each of the one or more objects using the offset.

20 Claims, 7 Drawing Sheets

GENERATION AND APPLICATION OF AUTONOMOUSLY-CREATED THREE-DIMENSIONAL SAFETY OFFSET BOUNDING SURFACES FROM THREE-DIMENSIONAL VIRTUAL MAPS AROUND POINTS OF INTEREST

TECHNICAL FIELD

This disclosure relates generally to defensive systems. More specifically, this disclosure relates to the generation and application of autonomously-created three-dimensional safety offset bounding surfaces from three-dimensional virtual maps around points of interest.

BACKGROUND

The generation of firing safety trajectory maps for ground- and marine-based launching systems that fire from locations close to the ground is a very time-consuming process and typically returns a two-dimensional (2D) map that restricts movement and firing within designated zones. Shore- and land-based environments are very complex and can change from time to time, which makes it difficult to continually update permissible firing trajectory files fast enough to keep up with changes in the environment. Often times, a launching system is not located close enough to system sensors to develop firing cutout maps that reflect the exact relationships of close-in objects to the launching system.

SUMMARY

This disclosure provides for the generation and application of autonomously-created three-dimensional safety offset bounding surfaces from three-dimensional virtual maps around points of interest.

In a first embodiment, an apparatus includes at least one memory configured to store map data. The apparatus also includes at least one processor configured to segment one or more objects from one or more environment surfaces in the map data. The at least one processor is also configured to determine an offset based on a projectile drift. The at least one processor is further configured to generate a safety bounding box around each of the one or more objects using the offset.

In a second embodiment, a method includes segmenting one or more objects from one or more environment surfaces in map data. The method also includes determining an offset based on a projectile drift. The method further includes generating a safety bounding box around each of the one or more objects using the offset.

In a third embodiment, a non-transitory machine readable medium stores instructions that when executed cause at least one processor to segment one or more objects from one or more environment surfaces in map data. The instructions when executed also cause the at least one processor to determine an offset based on a projectile drift. The instructions when executed further cause the at least one processor to generate a safety bounding box around each of the one or more objects using the offset.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
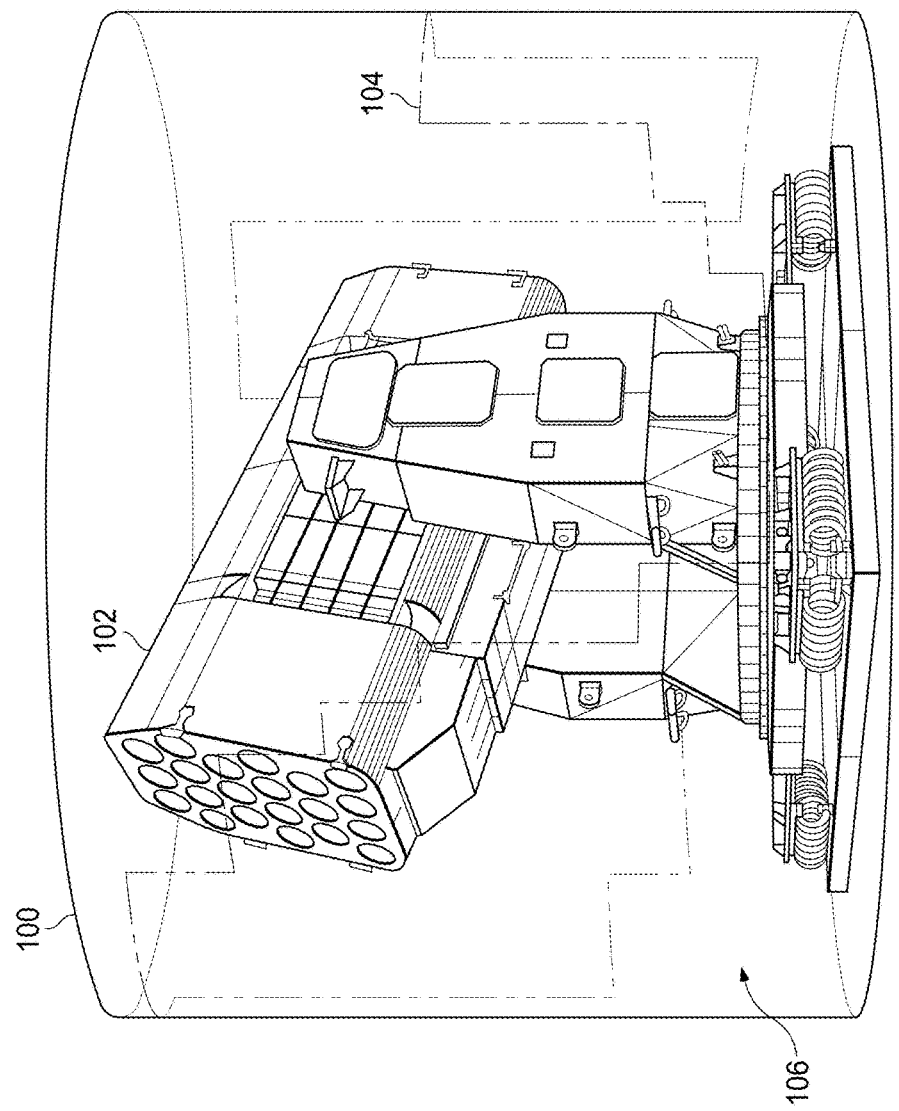
FIG. 1 illustrates an example cutout zone in accordance with this disclosure.

FIGS. 1 through 7, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, the generation of firing safety trajectory maps for ground- and marine-based launching systems that fire from locations close to the ground is a very time-consuming process and typically returns a two-dimensional (2D) map that restricts movement and firing within designated zones. Shore- and land-based environments are very complex and can change from time to time, which makes it difficult to continually update permissible firing trajectory files fast enough to keep up with changes in the environment. Often times, a launching system is not located close enough to system sensors to develop firing cutout maps that reflect the exact relationships of close-in objects to the launching system. Current approaches for generating firing safety trajectory maps typically do not provide an ability to see in three dimensions. Also, current approaches for generating firing safety trajectory maps typically do not provide a "fire on the run" capability, meaning the firing safety trajectory maps are not generated when a launching system is moving or has recently been moved.

Currently-proposed solutions often involve the use of infrared cameras and machine learning to capture an image and generate a 2D cutout based on the current field of view, which is limited when it comes to distance information. Camera sensors generally capture 2D flat images, which is acceptable for rolling airframe missile (RAM) launchers using 2D cutouts that are non-dynamic, based on manual surveys of ship structures, set at deployment, and rarely change. Current solutions to generate firing safety trajectory maps are often very rudimentary and designed primarily for naval applications, such as by creating adaptable horizon lines below which a launcher is not allowed to point and fire. These lines are located in a 2D plane wrapped cylindrically around the launcher, and this is not a suitable solution for a land-based launching system (since distance becomes a factor in engagement and avoidance). Current land-based launching systems often require a large clearance zone around the launcher where no objects can reside. For example, national advanced surface-to-air missile systems (NASAMSs) often design 2D cutouts based on fixed elevations (such as between 23-37°) and manual calculations. Patriot missiles are fired at high elevations and do not allow personnel or buildings within ninety meters of the launchers. This limits the locations in which launchers can be placed and therefore limits the areas that launchers can protect. Current solutions are also limited to line-of-sight approaches, so there is no capability to see around or beyond the first sight obstruction.

This disclosure provides for the generation and application of autonomously-created three-dimensional (3D) safety offset bounding surfaces from 3D virtual maps around points of interest. As described in more detail below, map data (such as one or more 3D point cloud maps, one or more 3D surface maps, one or more other 3D maps, a combination of two or more different 3D maps, etc.) of a given location and environment can be obtained, such as from one or more drones that support the use of light detection and ranging (LIDAR) technology or other sensing technology. In some cases, 3D point cloud data is taken in its raw format and pre-processed to generate a desired output, such as an output that can be processed using one or more software functions or other functions. The one or more functions can be used to deconstruct the map data or the pre-processed map data and separate one or more structures and other above-ground objects from the Earth's surface or other environment surface(s). Using the segmented information, the one or more functions can be used to generate an offset bounding box around each above-ground object, where each offset bounding box represents a safety zone into which a projectile (such as a missile) should not be launched. A map containing the one or more offset bounding boxes can be uploaded into the onboard computer of a projectile launcher (such as a missile launcher) so that the launcher now has knowledge of one or more surrounding objects and a distance to each surrounding object.

Having this information allows the launcher to receive threat location data, such as from a command and control system, and determine when and in what direction the launcher is able to fire at least one projectile, such as for offensive or defensive purposes. Ideally, this allows for projectiles to be safely launched while avoiding contact with civilian or non-threat objects. These capabilities allow launchers to be placed almost anywhere without fear of damaging non-threat objects when engaging actual threats. Moreover, these capabilities allow updated maps to be produced rapidly and safely in order to reflect changing surroundings in which the launchers are placed, which supports "fire on the run" capabilities or other capabilities. In addition, these capabilities allow projectiles to be more safely fired in various applications, such as at low altitudes and in close quarters.

FIG. 1 illustrates an example cutout zone 100 in accordance with this disclosure. As shown in FIG. 1, the cutout zone 100 is shown as being positioned around a launcher 102, where the cutout zone 100 generally defines the directions in which the launcher 102 is able to fire projectiles based on the launcher's surrounding environment. In this example, the cutout zone 100 is shown as a cylindrical map surrounding the launcher 102. Note that the cutout zone 100 shown here is for illustrative purposes only and is implemented in computer code or otherwise virtually, such as based on one or more sensors in the launcher 102 that can determine an orientation of the launcher 102.

The launcher 102 represents any suitable type of launching system for missiles or other projectiles. For example, the launcher 102 may represent a launcher installed on a ship or on a fixed or mobile ground turret or other platform. For any launcher 102, safety is generally a top concern. Certain types of launchers, such as RAM launchers, pose a unique quandary in that projectiles have the potential to be launched at altitudes of less than 90° (compared to vertical launchers), which potentially poses risks to nearby structures and equipment. In land-based scenarios, the potential for friendly fire increases drastically compared to shipboard applications due to the predictability of friendly objects in relation to launchers and the sizes of friendly objects and targets. Depending on the location of a launcher 102, there may be dense saturation of buildings and equipment and movement of mobile units that come and go. In some cases, temporary structures may be set up and removed from time to time. Also, the launcher 102 may be moved from location to location, which would require new inputs for current surroundings. Regardless of the situation, a quick, accurate, and dynamic solution for generating surrounding environmental images that are translated into keep-out zones 106 based on defined safety parameters can be provided as described below.

In this example, the cutout zone 100 includes a horizon line 104 that defines a keep-out zone 106. The generation of a keep-out zone 106 conventionally involves a lengthy manual survey performed of the location where the launcher 102 will reside. From the manual survey of the environment, a manual and very crude keep-out zone 106 can be generated. For shipboard applications, a keep-out zone 106 can be hard coded into the launcher 102, never to be altered or tampered with unless something on the ship drastically changes. For land-based applications, an unpopulated area surrounding the launcher 102 is required. Currently, this information is non-transferable to a missile or other projectile for guidance navigation. The ability to allow the launcher 102 to upload mapping information to the projectile would be invaluable in minimizing no-fire areas and giving the projectile an ability to avoid friendly obstacles in a path of the projectile from the launcher 102.

Although FIG. 1 illustrates one example of a cutout zone 100, various changes may be made to FIG. 1. For example, the form of the launcher 102 here is for illustration only and can easily vary depending on the specific launcher being used. Also, the cutout zone 100 here is merely one example of the type of cutout zone that may be used with a launcher 102. The specific cutout zone 100 used with a specific launcher 102 depends (among other things) on the environment surrounding the launcher 102.

Figure 2:
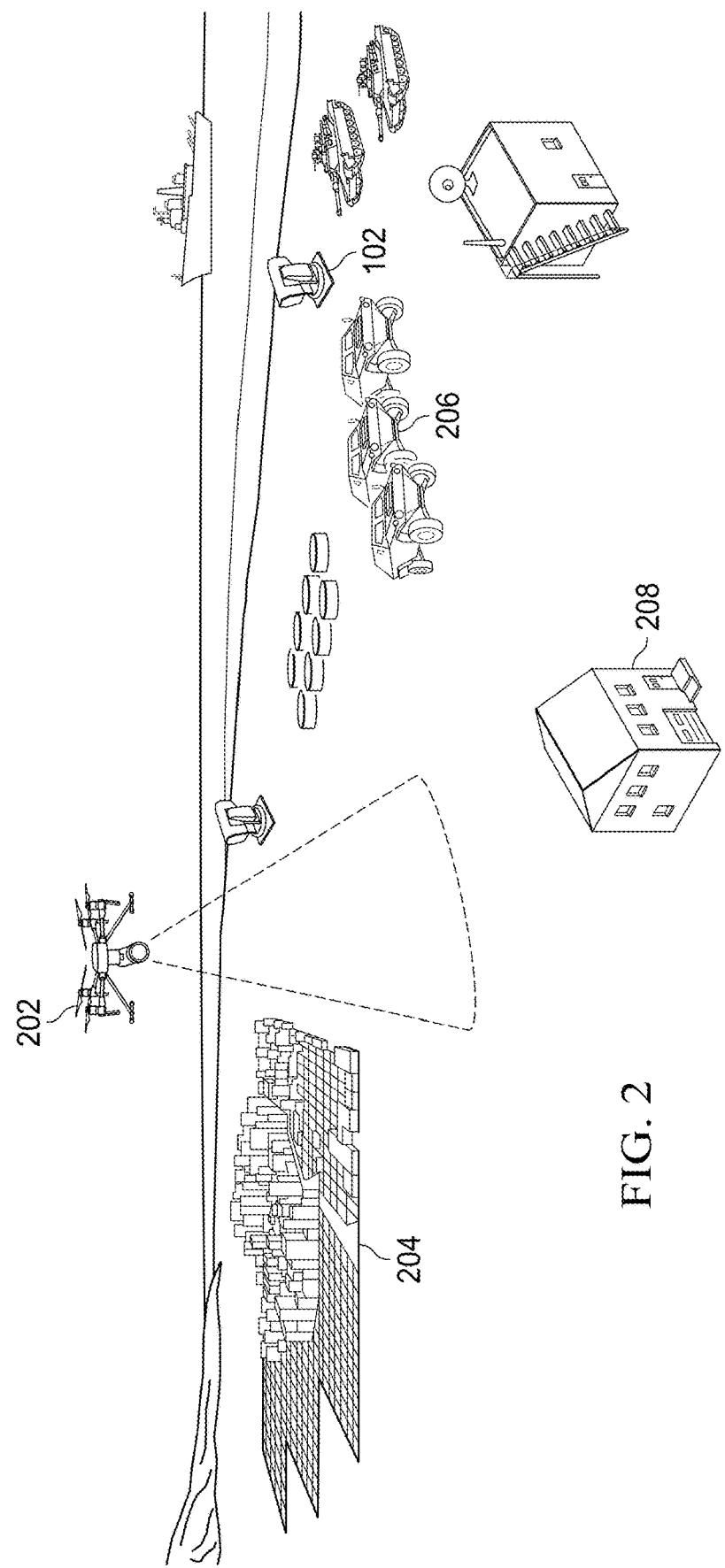
FIG. 2 illustrates an example optimized safety zone map in accordance with this disclosure.

FIG. 2 illustrates an example optimized safety zone map 200 in accordance with this disclosure. As shown in FIG. 2, a drone 202 is being used to identify safety zones 204. For example, drone-mounted LIDAR scanning may allow for large areas to be scanned with high resolution from a single unit. In some cases, a large scan of an entire environment may be performed, as well as quick local scans of areas of interest. Thus, for instance, the drone 202 can fly over a region where a launcher 102 is or will be positioned in order to identify friendly or civilian objects, such as friendly military objects 206 and civilian objects 208. In some embodiments, military objects 206 may include other launchers 102. The drone 202 can identify locations of the friendly or civilian objects and generate corresponding safety zones 204 on the safety zone map 200. The safety zone map 200 may then be loaded onto the launcher 102 for use in avoiding the firing of projectiles in certain directions. In some embodiments, the launcher 102 can receive the scan(s) from the drone 202 and process the information in real-time to identify objects that can be toggled as friendly objects or target objects.

One or more LIDAR scans or other scans by the drone 202 can be enhanced with photogrammetry, which generates measurements from photographs. For example, a camera may be additionally mounted to the drone 202 with the LIDAR scanner in order to simultaneously capture the LIDAR scans and the photographed images. In other cases, a camera may be mounted on the launcher 102 and used to capture photographed images. Using photographs in addition to LIDAR scans can allow for visual references to be used in the system by the launcher 102.

Although FIG. 2 illustrates one example of an optimized safety zone map 200, various changes may be made to FIG. 2. For example, the contents of the optimized safety zone map 200 can easily vary based on the environment surrounding the launcher 102. Also, the sizes of the safety zones 204 around the identified objects may vary, such as when safety zones 204 of different sizes are used around different types of objects. In addition, the optimized safety zone map 200 may be generated by any suitable device using any suitable data, and this disclosure is not limited to use of data from a drone 202 or generation of the optimized safety zone map 200 at a launcher 102.

Figure 3:
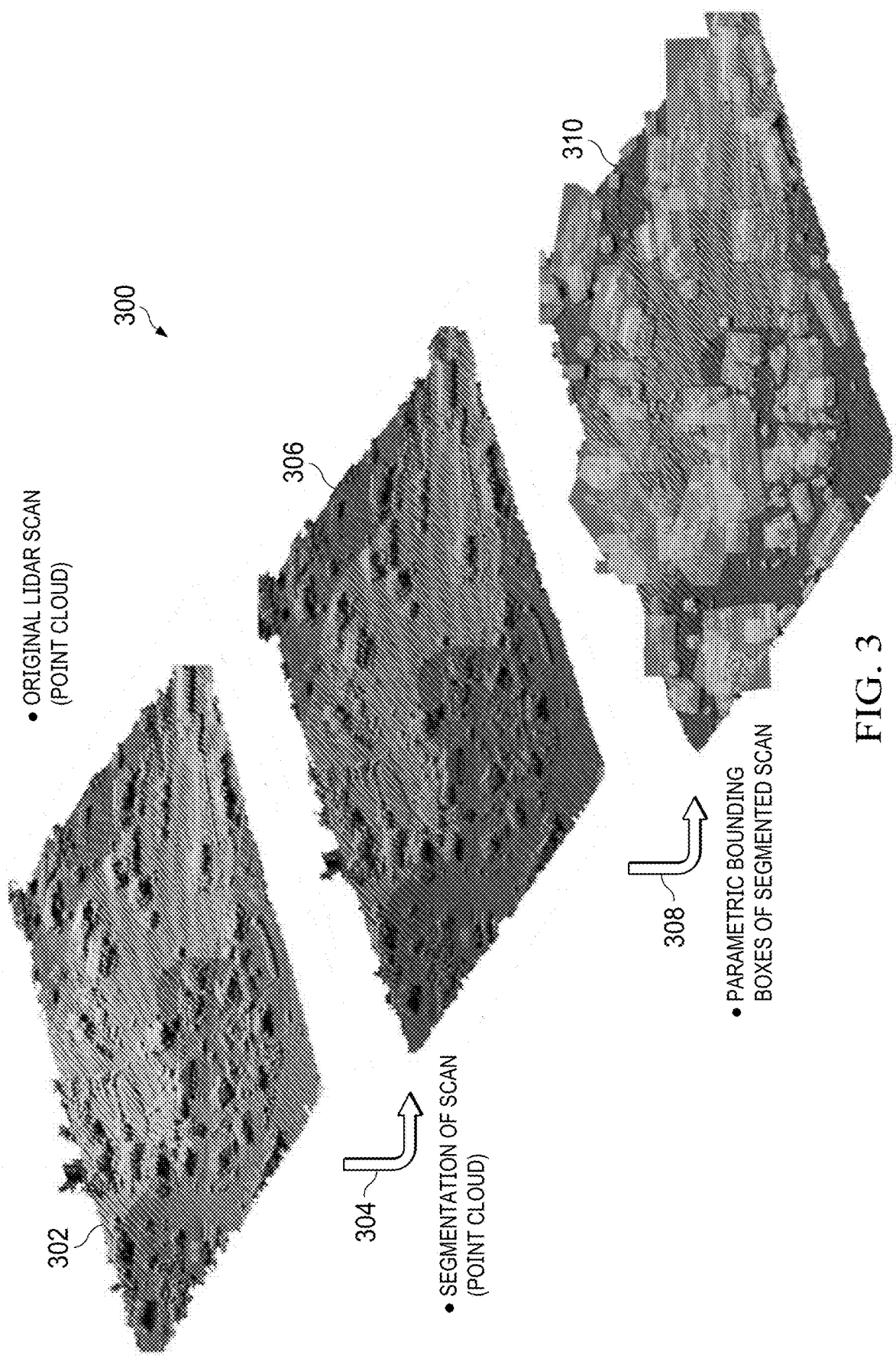
FIG. 3 illustrates an example data manipulation to support generation of autonomously-created three-dimensional safety offset bounding surfaces from three-dimensional virtual maps around local points of interest in accordance with this disclosure.

FIG. 3 illustrates an example data manipulation 300 to support generation of autonomously-created three-dimensional safety offset bounding surfaces from three-dimensional virtual maps around local points of interest in accordance with this disclosure. More specifically, FIG. 3 illustrates how LIDAR data (such as from a drone 202) or other data may be processed to support a safety protocol for launching projectiles. In this example, one or more LIDAR sensors (such as those mounted on the drone 202) can be used to gather and generate 3D maps of point cloud data 302 for a location and an environment. The 3D point cloud data 302 can be taken in its raw format and pre-processed, such as to provide filtering and data conversion if needed or desired.

The point cloud data 302 (or a pre-processed version thereof) is processed using a segmentation scan 304 to generate object data 306. The object data 306 generally identifies different objects within the point cloud data 302. In some cases, the object data 306 can be tagged or otherwise differentiated in order to identify different types of objects within the point cloud data 302. For example, the point cloud data 302 can be deconstructed to separate out structures and other above-ground objects from the Earth's surface or other environment surface(s). As particular examples, shrubbery, trees, and other natural features may be segmented from buildings, roads may be segmented from dirt, etc.

Bounding box generation 308 may be performed using the object data 306 in order to generate offset bounding box data 310. The offset bounding box data 310 generally identifies a box or other boundary around one or more selected ones of the objects identified in the object data 306. Each of the offset bounding box data 310 may be said to represent a safety zone 204 associated with a launcher 102. As described below, in some embodiments, the boundaries defined by the offset bounding box data 310 can be based on a drift associated with projectiles that may be fired from the launcher 102.

In some cases, the safety zone map 200 can be generated as shown in FIG. 3 and uploaded into an onboard computer of the launcher 102, a command and control system associated with the launcher 102, or other suitable destination(s). The safety zone map 200 can be used to prevent the launcher 102 from firing projectiles at or near identified objects around the launcher 102. This allows the launcher 102 to receive threat location data, such as from a command-and-control system, and determine when and in what direction the launcher 102 is able to fire at least one projectile.

Although FIG. 3 illustrates one example of a data manipulation to support the generation of autonomously-created three-dimensional safety offset bounding surfaces from three-dimensional virtual maps around local points of interest, various changes may be made to FIG. 3. For example, the specific data being processed and the objects and boundaries identified can easily vary based on the environment around the launcher 102.

Figure 4A:
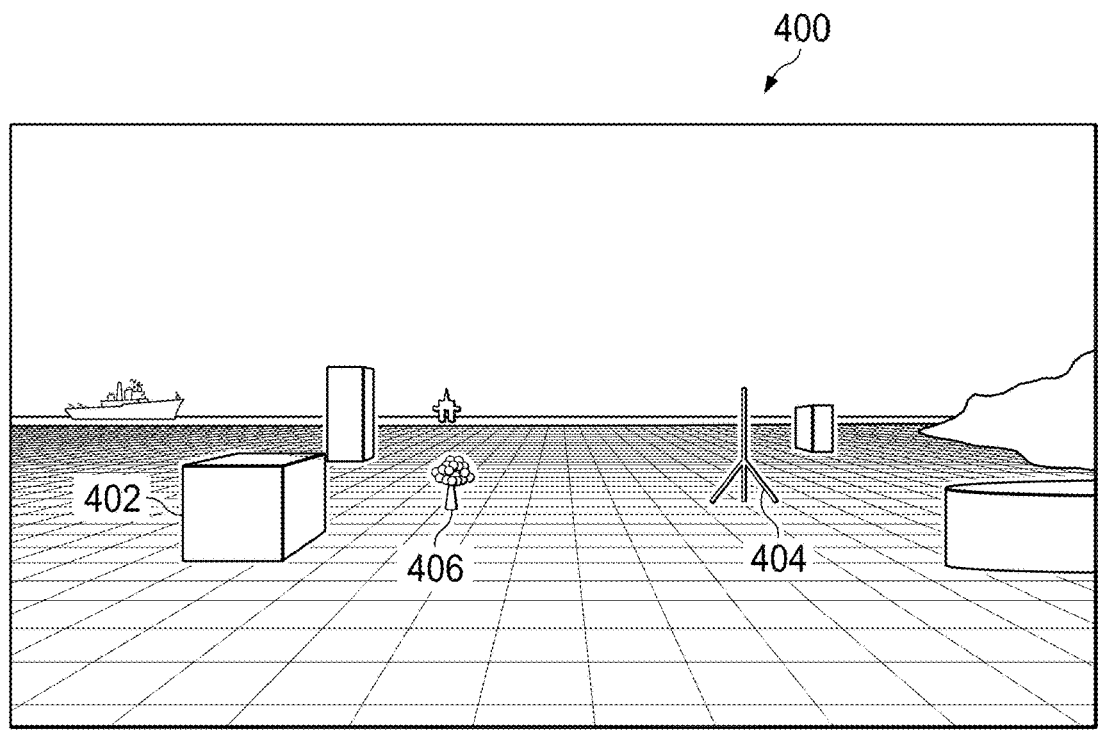
FIGS. 4A and 4B illustrate an example area scan and offset map in accordance with this disclosure.
Figure 4B:
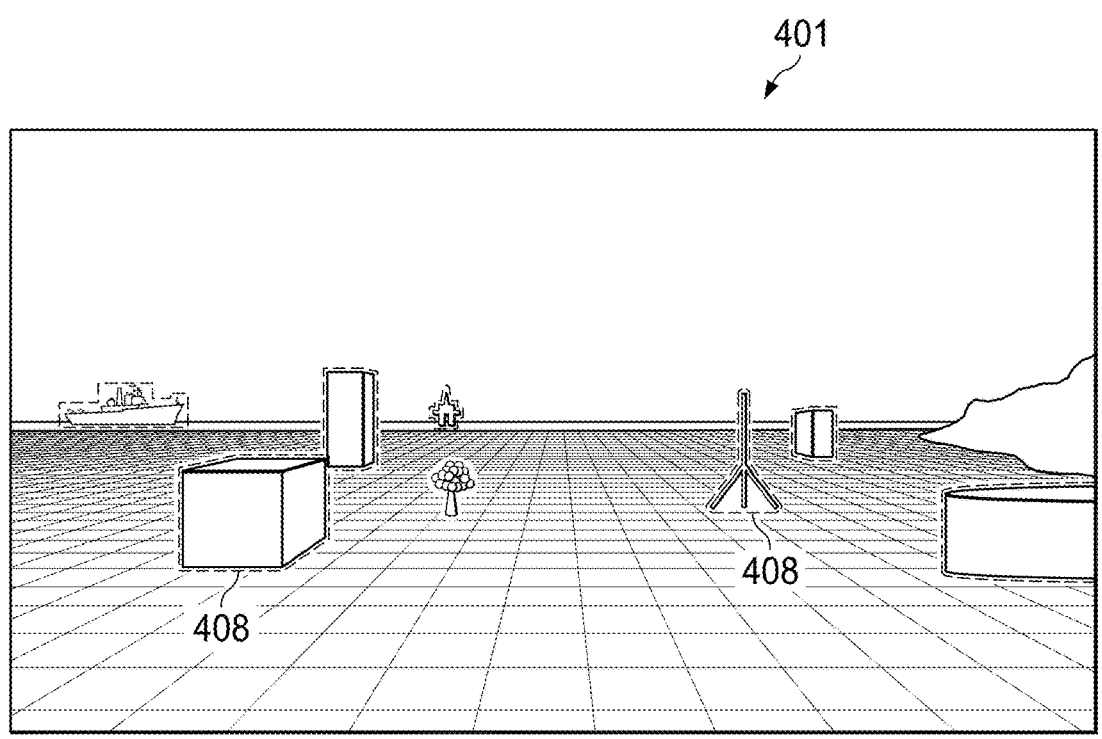

FIGS. 4A and 4B illustrate an example area scan 400 and offset map 401 in accordance with this disclosure. As shown in FIGS. 4A and 4B, the area scan 400 can represent an example of a segmentation scan 304 of the point cloud data 302. The area scan 400 can identify points of interest, such as structures 402, objects 404, and targets 406. Offset safety bounding boxes 408 can be generated for the structures 402 and objects 404 using the bounding box generation 308. Again, as described above, the offset safety bounding boxes 408 may be used to prevent a launcher 102 from firing projectiles at or near certain structures 402 and objects 404 protected using the offset safety bounding boxes 408.

Although FIGS. 4A and 4B illustrate one example of an area scan 400 and an offset map 401, various changes may be made to FIGS. 4A and 4B. For example, the contents of the area scan 400 and the offset map 401 can easily vary based on the environment surrounding the launcher 102. Also, the sizes of the offset safety bounding boxes 408 may vary, such as when offset safety bounding boxes 408 of different sizes are used around different types of objects.

Figure 5A:
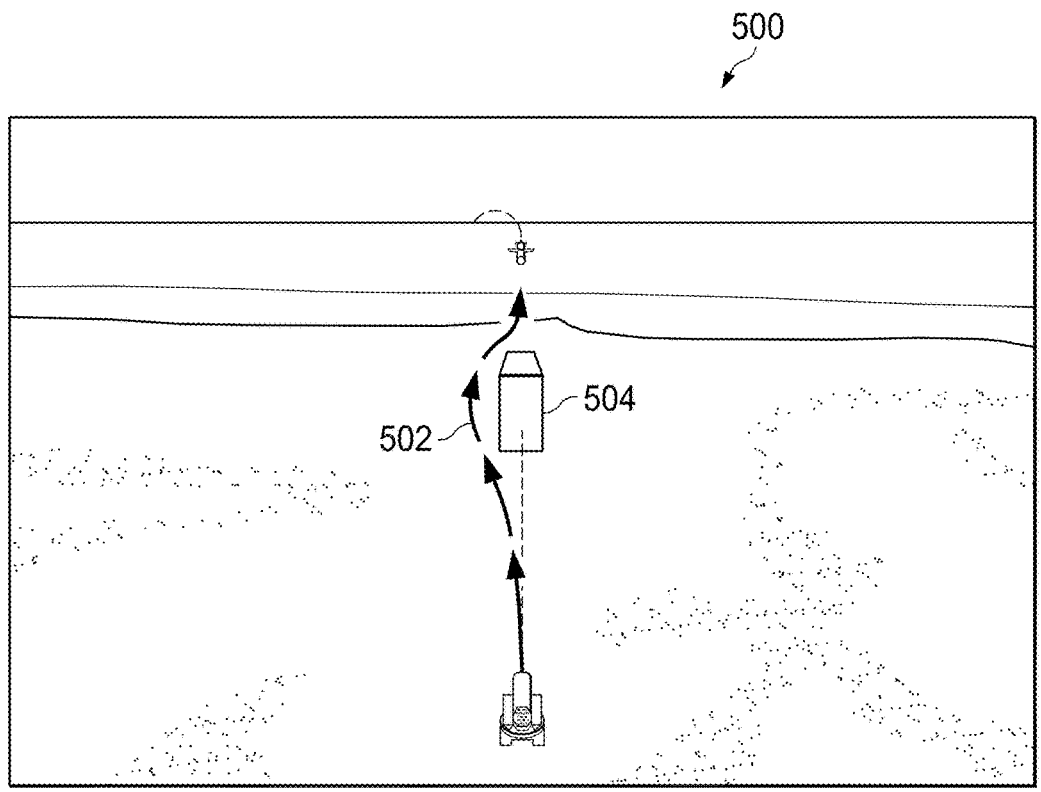
FIGS. 5A and 5B illustrate an example projectile ability in accordance with this disclosure.
Figure 5B:
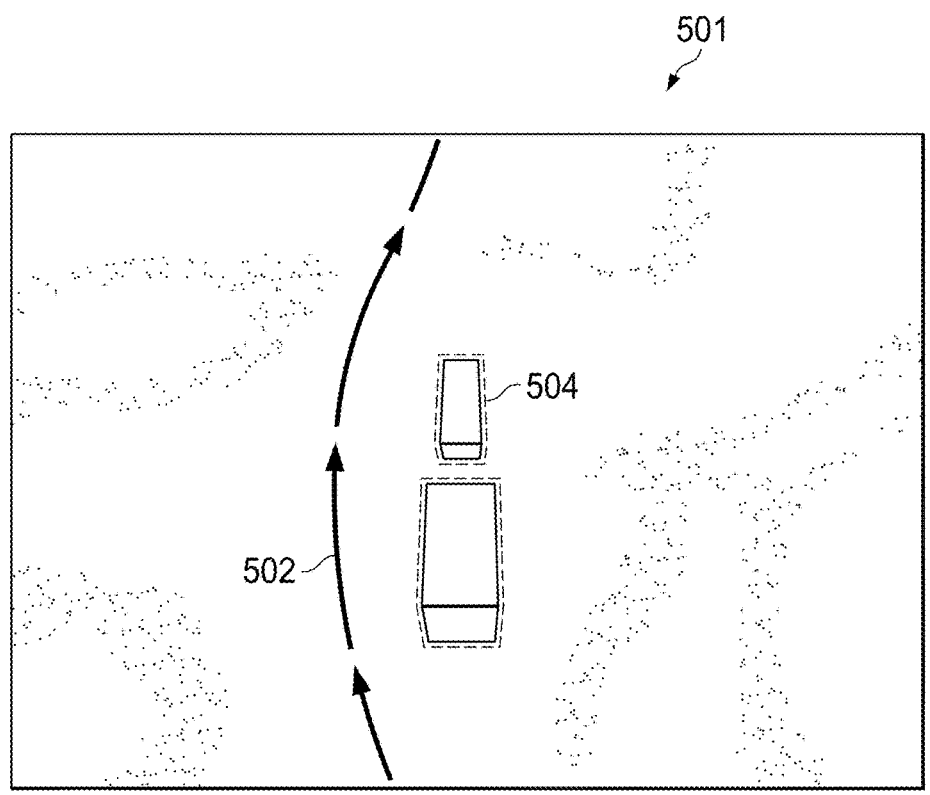

FIGS. 5A and 5B illustrate an example projectile ability 500, 501 in accordance with this disclosure. In particular, FIG. 5A illustrates a first view of an example projectile ability 500, and FIG. 5B illustrates a second view of an example projectile ability 501. As shown in FIGS. 5A and 5B, generating a safety zone map 200 allows the launcher 102 to know its surroundings in three dimensions and to fire a projectile 502 in a direction that will not make contact with a protected structure or other object 504. As a result, launchers 102 can be placed almost anywhere without the fear of damaging local structures and objects when engaging a threat or target. Quick, efficient, and accurate 3D offset boundary zones around above-ground points of interest can be generated as safety zones for launcher avoidance.

Although FIGS. 5A and 5B illustrate one example of a projectile ability 500, 501, various changes may be made to FIGS. 5A and 5B. For example, a projectile may be launched in any other suitable manner based on any other suitable boundaries for identified protected objects.

Figure 6:
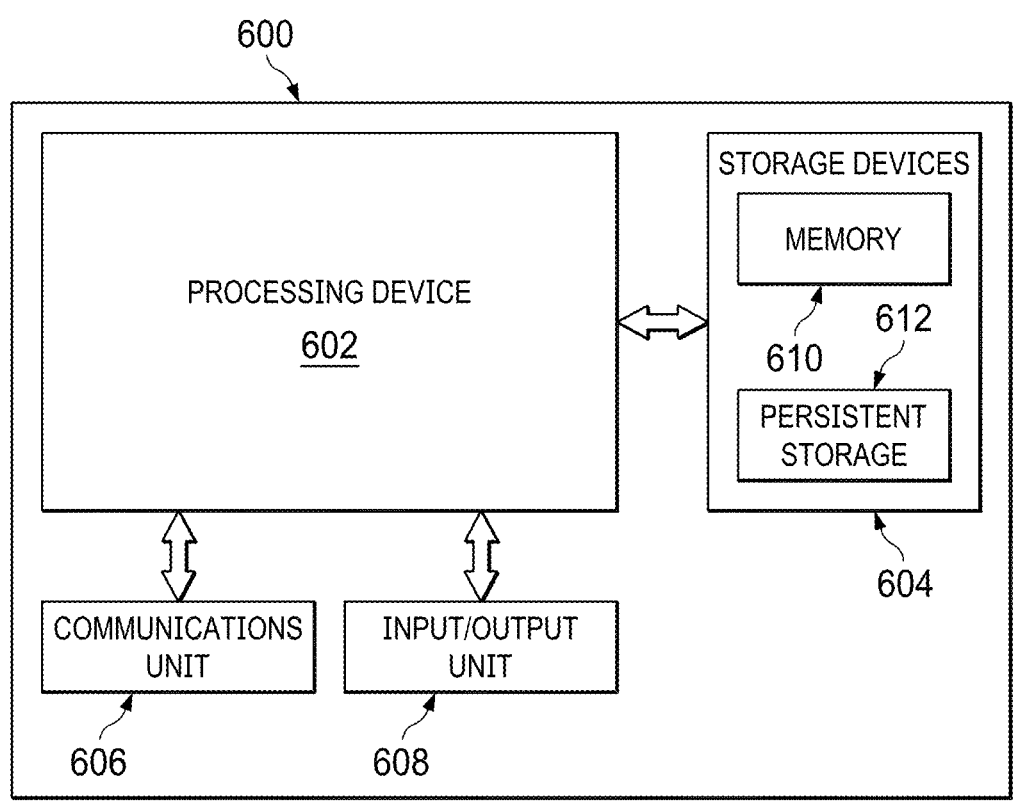
FIG. 6 illustrates an example device supporting generation and application of autonomously-created three-dimensional safety offset bounding surfaces from three-dimensional virtual maps around local points of interest in accordance with this disclosure.

FIG. 6 illustrates an example device 600 supporting generation and application of autonomously-created 3D safety offset bounding surfaces from 3D virtual maps around local points of interest in accordance with this disclosure. One or more instances of the device 600 (or portions thereof) may, for example, be used to at least partially implement the functionality of the launcher 102 of FIG. 1 or other device or system that can implement the approach shown in FIGS. 2 and 3. However, this functionality may be implemented in any other suitable manner.

As shown in FIG. 6, the device 600 denotes a computing device or system that includes at least one processing device 602, at least one storage device 604, at least one communications unit 606, and at least one input/output (I/O) unit

608. The processing device 602 may execute instructions that can be loaded into a memory 610. The processing device 602 includes any suitable number(s) and type(s) of processors or other devices in any suitable arrangement. Example types of processing devices 602 include one or more microprocessors, microcontrollers, digital signal processors (DSPs), application-specific integrated circuits (ASICs), graphics processing units (GPUs), field-programmable gate arrays (FPGAs), or discrete circuitry.

The memory 610 and a persistent storage 612 are examples of storage devices 604, which represent any structure(s) capable of storing and facilitating retrieval of information (such as data, program code, and/or other suitable information on a temporary or permanent basis). The memory 610 may represent a random access memory or any other suitable volatile or non-volatile storage device(s). The persistent storage 612 may contain one or more components or devices supporting longer-term storage of data, such as a read only memory, hard drive, Flash memory, or optical disc.

The communications unit 606 supports communications with other systems or devices. For example, the communications unit 606 can include a network interface card or a wireless transceiver facilitating communications over a wired or wireless network. The communications unit 606 may support communications through any suitable physical or wireless communication link(s).

The I/O unit 608 allows for input and output of data. For example, the I/O unit 608 may provide a connection for user input through a keyboard, mouse, keypad, touchscreen, or other suitable input device. The I/O unit 608 may also send output to a display or other suitable output device. Note, however, that the I/O unit 608 may be omitted if the device 600 does not require local I/O, such as when the device 600 can be accessed remotely or operated autonomously.

In some embodiments, the instructions executed by the processing device 602 can include instructions that implement all or portions of the functionality described above. For example, the instructions executed by the processing device 602 can include instructions for generation and application of autonomously-created 3D safety offset bounding surfaces from a 3D virtual map around local points of interest. Thus, for example, the instructions when executed by the processing device 602 can cause the processing device 602 to receive and process map data, identify one or more objects in the map data (such as by segmenting the one or more objects from one or more environment surfaces in the map data), and generate a safety bounding box around each of the one or more objects. As described below, the safety bounding boxes can be identified based on or using a drift associated with projectiles that may be fired from the launcher 102.

Although FIG. 6 illustrates one example of a device 600 supporting generation and application of autonomously-created 3D safety offset bounding surfaces from 3D virtual maps around local points of interest, various changes may be made to FIG. 6. For example, computing devices and systems come in a wide variety of configurations, and FIG. 6 does not limit this disclosure to any particular computing device or system.

Figure 7:
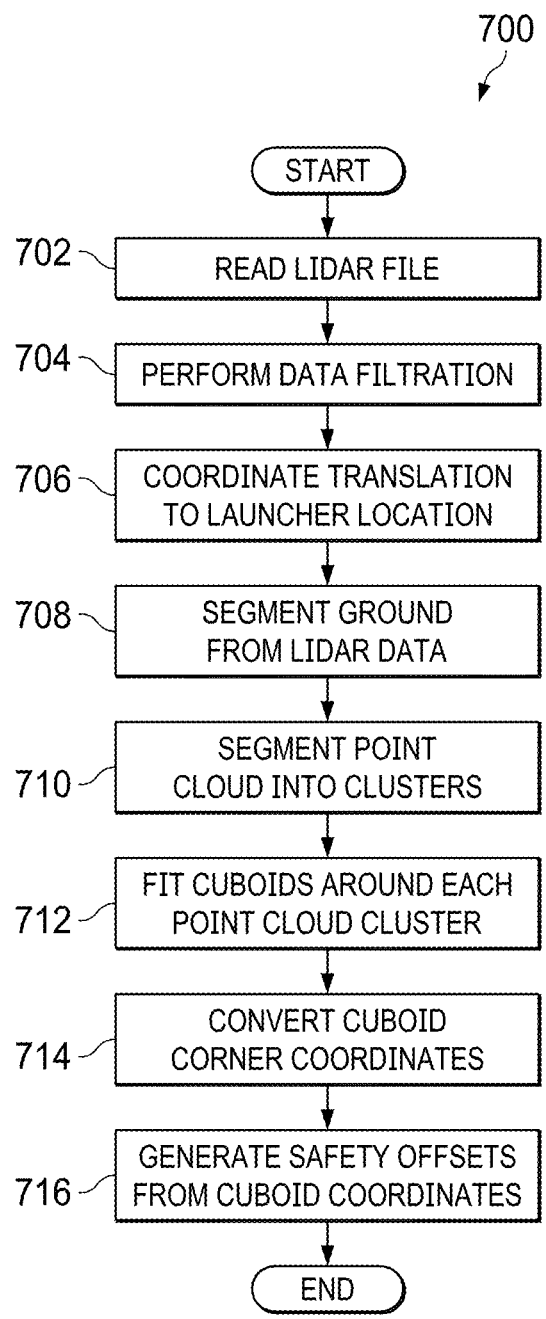
FIG. 7 illustrates an example method for generating safety offsets for a safety zone map according to this disclosure.

FIG. 7 illustrates an example method 700 for generating safety offsets for a safety zone map according to this disclosure. For ease of explanation, the method 700 of FIG. 7 is described as being performed using the device 600 of FIG. 6, which may be used in or with the launcher 102 of FIG. 1. However, the method 700 may be used with any other suitable device or system and with any other suitable launcher.

As shown in FIG. 7, the device 600 can read a data file or otherwise obtain map data at step 702. In some cases, the LIDAR file can be generated by or include data from a LIDAR scan performed by a drone 202, and the LIDAR data file may be stored in the memory 610 or received through the communications unit 606. Note that while LIDAR data is shown as being used here, any other suitable map data may be obtained and used here. The device 600 can optionally perform data filtration or other pre-processing at step 704. For example, the data filtration may include determining data that is relevant to a location of installation for a launcher 102. The data filtration may also be performed to identify a specific area of interest or to identify an updated region (when a safety map for the location of the installation has already been generated). An example of an area of interest may include a populated area or an area with mobile objects 404 or targets 406. The device 600 coordinates translation of the data to launcher location at step 706. For example, the drone 202 or other source may include cameras or other imaging sensors that capture image frames of the area captured in the LIDAR scan for use in determining a distance to each point of the safety zone map 200.

The device 600 segments objects from the ground or other environment surfaces using the map data at step 708. For example, individual points in the LIDAR data file can be distinguished between a ground pixel or an object pixel. The device 600 can identify data related to a ground or other environment surface(s), such as a body of water, and the remaining data not identified as ground or other environment surface(s) may be classified as potential object data. The distances determined earlier can also be used to determine sizes and shapes of structures 402 and objects 404. The device 600 can segment point cloud data into clusters at step 710. For example, each potential object's data surrounded by ground data or other environment surface data can be identified as a cluster. The clusters can be distinguished as structures 402, objects 404, and targets 406 within the map data. A location or distance of each of the structures 402, objects 404, and targets 406 can be determined from a launcher 102 can also be determined.

The device 600 fits cuboids around each point cloud cluster at step 712. For example, each cluster can be simplified into a cuboid to reduce the complexity of the cluster. A cuboid can represent a simple or complex polyhedron that is generated using any typical suitable technique. The device 600 converts each cuboid's corner coordinates at step 714. For example, the corners can be detected based on points where more than two lines of a cuboid meet. The device 600 generates safety offsets from each cuboid's corner coordinates at step 716. For example, each safety offset can be determined at a distance from each cuboid's corner in a direction away from a center of the cuboid. Note, however, that each safety offset can be determined as a distance from a cuboid's corner, from any surface of the cuboid, from a center of the cuboid, or in any other suitable manner. Each safety offset can also be determined based on multiple factors, such as possible projectile drift and a minimal safety threshold. In some embodiments, the projectile drift can be based on aerodynamics of the projectile, such as whether the aerodynamics of the projectile affect the projectile's drift along a flight path to a target. In some cases, each safety offset can be represented as a safety vector with a magnitude and a direction. As a particular example, each safety vector can include or be based on one or more components of a corner vector, one or more components of a mechanical vector, and/or one or more components of a wind vector.

The determination of the safety offsets here can involve an identification of a maximum projectile drift that may occur during travel of a projectile, such as from the launcher 102 to an object associated with a safety offset. This can help to prevent a projectile from striking an object associated with a safety offset during travel of the projectile from the launcher 102 to a target. This maximum projectile drift can be based on various factors, such as a mechanical component (which is based on the design of the projectile itself) and a wind speed component. In some cases, the wind speed component can be based on actual or estimated strength and direction of the wind around the launcher 102, around the target, around the object(s) associated with the safety offset(s), or other area(s). Each safety vector can include or be based on a corner vector that extends in a direction from a corner of a point cloud in a direction away from a center of the point cloud. The magnitude of the corner vector can be a minimum safety offset or some other predetermined offset. The direction of the corner vector for each corner of a point cloud can have a direction that is away from a center of the point cloud. In some embodiments, the direction of the corner vector solely defines the direction of the safety vector, while the magnitude of the safety vector can include additional components.

In some embodiments, the mechanical component of the projectile drift caused by the design of the projectile (also referred to as mechanical drift) may include factors such as gyroscopic procession due to spinning of the projectile. The gyroscope effect serves to stabilize the projectile but may cause the projectile to move laterally during flight. Moreover, air pressure on an underside of the nose of the projectile may cause lateral movement of the projectile. Note that the amount of projectile drift can also increase as the projectile travels over longer distances. Thus, a component of the safety offset based on the mechanical component of projectile drift can be determined using the expected drift of the projectile over the distance between its launcher 102 and an object to be avoided. This helps to partially define the safety offset for each object to be avoided.

In some cases, the mechanical component of projectile drift can be determined as a mechanical vector that can be used as a primary vector or an additional vector in the determination of the safety vector. For example, the mechanical vector can include a magnitude and a direction along a path of a projectile. The magnitude and the direction associated with a corner of a point cloud can be used for the safety vector at that corner of the point cloud. In some embodiments, the magnitude and the direction of the projectile at a target can be used for the corners of all point clouds. Using the mechanical vector at the target can provide the largest magnitude along a path of the projectile. In other embodiments, the magnitude of the mechanical vector at the target may be used, while a direction of the mechanical vector corresponding a specific corner of a point cloud may be used. In order to determine a mechanical vector at specific points on the safety map, the system may "aim" the projectile path at the corner of the point cloud for purposes of calculating the components of the mechanical vector while not actually firing a projectile. The mechanical vector can be directly added to a corner vector for each corner on the safety map to produce the safety vector for the offset, or the corresponding amount of the magnitude for the mechanical vector aligned in the specific direction for each of the corner vectors may be added to a magnitude for each safety vector.

In some embodiments, the wind component of the projectile drift (also referred to as wind drift) is based on an amount and direction of wind that does or may affect a projectile. For example, the wind drift can depend on a time-of-flight of a projectile and a wind speed acting on a cross-sectional area of the projectile. In some cases, the offset based on wind drift can be determined based on the time-of-flight to a target and a maximum wind speed detected along its flight path. In some particular embodiments, this offset can be applied equally to all structures and other objects within the area. In other particular embodiments, the offset based on wind drift for a specific structure or other object can be determined based on the time-of-flight to that object. In some cases, the maximum wind speed at the structure or other object, the target, or along the flight path can be estimated for use in determining the wind drift.

In some embodiments, because wind typically travels in a general direction, the wind drift can be determined or expressed as a vector at each corner of a point cloud generated for a specific structure or other object to be avoided. In embodiments where the safety offset is represented as a safety vector, a magnitude of a wind vector that affects the safety vector may be determined based on a direction of the wind vector compared to the direction of the corner vector. This would allow for a more accurate wind offset calculation since it would adjust a safety zone based on the wind. For example, the wind may be moving in the same direction as the path of the projectile, in which case the wind may cause minimal wind drift on the projectile (regardless of the wind speed). When the wind vector is in the opposite direction as the corner vector, the system can ignore the wind vector or reduce the corner vector to a minimal safety vector for the specific corner vector. A magnitude of the wind vector aligned with the corner vector can be used to produce the safety vector for the offset. In some cases, the wind vector of the wind drift for the projectile can be determined as an additional vector to the corner vector, and both can be used to identify the associated safety vector. For example, a magnitude of the wind vector aligned with the direction of the corner vector can be added to the magnitude of corner vector to produce the safety vector. Any combination of the magnitudes for the mechanical vector, the wind vector, and the corner vector can be used to determine a magnitude for the safety vector.

In some embodiments, anemometers or other wind speed sensors may be installed or otherwise be present within a designated area of interest, on the launcher 102, and/or on the drone 202. The wind speed sensors can measure speeds of the wind at their respective locations, and the measured wind speeds may be used to help estimate the drift of a projectile. However the estimated drift is determined, the drift of the projectile (such as the total possible drift of the projectile in distance or degrees) can be used to define the safety offsets. For example, the safety offsets can be large enough so that the expected drift of the projectile from the launcher 102 to the associated objects would not allow the projectile to strike any of the associated objects. Note that the drift can be used individually or in combination with other factors, such as a minimal clearance offset, when defining the safety offsets. Also note that various types of wind speeds may be used when defining the safety offsets, such as a wind speed associated with a location of the launcher 102, a wind speed associated with the drone 202, historical wind speed measurements in an area in which the launcher 102 is installed, or a maximum wind speed in the area over a period of time (such as an hour, day, week, etc.). Wind speeds can also be adjusted for factors such as time of day, inclement weather, etc. Using wind speed allows for a "variable offset" to be generated by the system. The variability would allow for reducing an offset during periods of low wind speed, which would provide a greater ability to strike targets while avoiding friendly obstacles.

Although FIG. 7 illustrates one example of a method 700 for generating safety offsets for a safety zone map, various changes may be made to FIG. 7. For example, while shown as a series of steps, various steps in FIG. 7 may overlap, occur in parallel, or occur any number of times.

The following describes example embodiments of this disclosure that implement or relate to the generation and application of autonomously-created 3D safety offset bounding surfaces from 3D virtual maps around points of interest. However, other embodiments may be used in accordance with the teachings of this disclosure.

In a first embodiment, an apparatus includes at least one memory configured to store map data. The apparatus also includes at least one processor configured to segment one or more objects from one or more environment surfaces in the map data. The at least one processor is also configured to determine an offset based on a projectile drift. The at least one processor is further configured to generate a safety bounding box around each of the one or more objects using the offset.

In a second embodiment, a method includes segmenting one or more objects from one or more environment surfaces in map data. The method also includes determining an offset based on a projectile drift. The method further includes generating a safety bounding box around each of the one or more objects using the offset.

In a third embodiment, a non-transitory machine readable medium stores instructions that when executed cause at least one processor to segment one or more objects from one or more environment surfaces in map data. The instructions when executed also cause the at least one processor to determine an offset based on a projectile drift. The instructions when executed further cause the at least one processor to generate a safety bounding box around each of the one or more objects using the offset.

Any single one or any suitable combination of the following features may be used with the first, second, or third embodiment. The projectile drift may be based on at least one of a mechanical drift and a wind drift. The offset based on the projectile drift may be determined based on a maximum projectile drift for a flight path of the projectile from a launcher to a target. The offset based on the projectile drift may be determined individually for each of the one or more objects. A direction for a safety vector of the offset based on the projectile drift for each object may be determined using a direction of a corner vector that extends from a point cloud associated with the object. A mechanical drift of the projectile may be determined as a mechanical vector. A magnitude of the mechanical vector aligned with the direction of the corner vector may be used to produce the safety vector for the offset. A wind drift of the projectile may be determined as a wind vector. A magnitude of the wind vector aligned with the direction of the corner vector may be used to produce the safety vector for the offset.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims

What is claimed is:

1. An apparatus comprising:
  at least one memory configured to store map data; and
  at least one processor configured to:
    segment one or more objects from one or more environment surfaces in the map data;
    determine an offset based on a projectile drift of a projectile, wherein a direction for a safety vector of the offset for each object is based on a direction of a corner vector that extends from a point cloud associated with the object, wherein a magnitude of the safety vector of the offset for each object is based on a magnitude of the corner vector that extends from the point cloud associated with the object;

generate a three-dimensional (3D) safety bounding box around each of the one or more objects using the offset;

apply the 3D safety bounding box around each of the one or more objects to a 3D virtual map for a projectile launcher; and upload the 3D virtual map to an onboard computer of the projectile launcher.

2. The apparatus of claim 1, wherein the projectile drift is based on at least one of a mechanical drift and a wind drift.

3. The apparatus of claim 1, wherein the offset based on the projectile drift is determined based on a maximum projectile drift for a flight path of the projectile from the projectile launcher to a target.

4. The apparatus of claim 1, wherein the offset based on the projectile drift is determined individually for each of the one or more objects.

5. The apparatus of claim 1, wherein:
a mechanical drift of the projectile is determined as a mechanical vector; and
a magnitude of the mechanical vector aligned with the direction of the corner vector is used to produce the safety vector for the offset.

6. The apparatus of claim 1, wherein:
a wind drift of the projectile is determined as a wind vector; and
a magnitude of the wind vector aligned with the direction of the corner vector is used to produce the safety vector for the offset.

7. The apparatus of claim 1, wherein the 3D safety bounding box is configured to prevent the projectile launcher from firing the projectile toward the one or more objects within the 3D safety bounding box.

8. A method comprising:
segmenting one or more objects from one or more environment surfaces in map data;
determining an offset based on a projectile drift of a projectile, wherein a direction for a safety vector of the offset for each object is based on a direction of a corner vector that extends from a point cloud associated with the object, wherein a magnitude of the safety vector of the offset for each object is based on a magnitude of the corner vector that extends from the point cloud associated with the object;
generating a three-dimensional (3D) safety bounding box around each of the one or more objects using the offset;
applying the 3D safety bounding box around each of the one or more objects to a 3D virtual map for a projectile launcher; and
uploading the 3D virtual map to an onboard computer of the projectile launcher.

9. The method of claim 8, wherein the projectile drift is based on at least one of a mechanical drift and a wind drift.

10. The method of claim 8, wherein the offset based on the projectile drift is determined based on a maximum projectile drift for a flight path of the projectile from the projectile launcher to a target.

11. The method of claim 8, wherein the offset based on the projectile drift is determined individually for each of the one or more objects.

12. The method of claim 8, wherein:
a mechanical drift of the projectile is determined as a mechanical vector; and
a magnitude of the mechanical vector aligned with the direction of the corner vector is used to produce the safety vector for the offset.

13. The method of claim 8, wherein:
a wind drift of the projectile is determined as a wind vector; and
a magnitude of the wind vector aligned with the direction of the corner vector is used to produce the safety vector for the offset.

14. The method of claim 8, wherein the 3D safety bounding box prevents the projectile launcher from firing the projectile toward the one or more objects within the 3D safety bounding box.

15. A non-transitory computer readable medium containing instructions that when executed cause at least one processor to:
segment one or more objects from one or more environment surfaces in map data;
determine an offset based on a projectile drift of a projectile, wherein a direction for a safety vector of the offset for each object is based on a direction of a corner vector that extends from a point cloud associated with the object, wherein a magnitude of the safety vector of the offset for each object is based on a magnitude of the corner vector that extends from the point cloud associated with the object;
generate a three-dimensional (3D) safety bounding box around each of the one or more objects using the offset;
apply the 3D safety bounding box around each of the one or more objects to a 3D virtual map for a projectile launcher; and
upload the 3D virtual map to an onboard computer of the projectile launcher.

16. The non-transitory computer readable medium of claim 15, wherein the projectile drift is based on at least one of a mechanical drift and a wind drift.

17. The non-transitory computer readable medium of claim 15, wherein the offset based on the projectile drift is determined based on a maximum projectile drift for a flight path of the projectile from the projectile launcher to a target.

18. The non-transitory computer readable medium of claim 15, wherein the offset based on the projectile drift is determined individually for each of the one or more objects.

19. The non-transitory computer readable medium of claim 15, wherein:
a mechanical drift of the projectile is determined as a mechanical vector;
a wind drift of the projectile is determined as a wind vector; and
at least one magnitude for at least one of the mechanical vector and the wind vector aligned with the direction of the corner vector is used to produce the safety vector for the offset.

20. The non-transitory computer readable medium of claim 15, wherein the 3D safety bounding box is configured to prevent the projectile launcher from firing the projectile toward the one or more objects within the 3D safety bounding box.

* * * * *